Oct. 18, 1949.  D. I. WEEDEN  2,485,226
ICING COMMINUTOR AND EXTRUDER
Filed Oct. 16, 1945 3 Sheets-Sheet 1
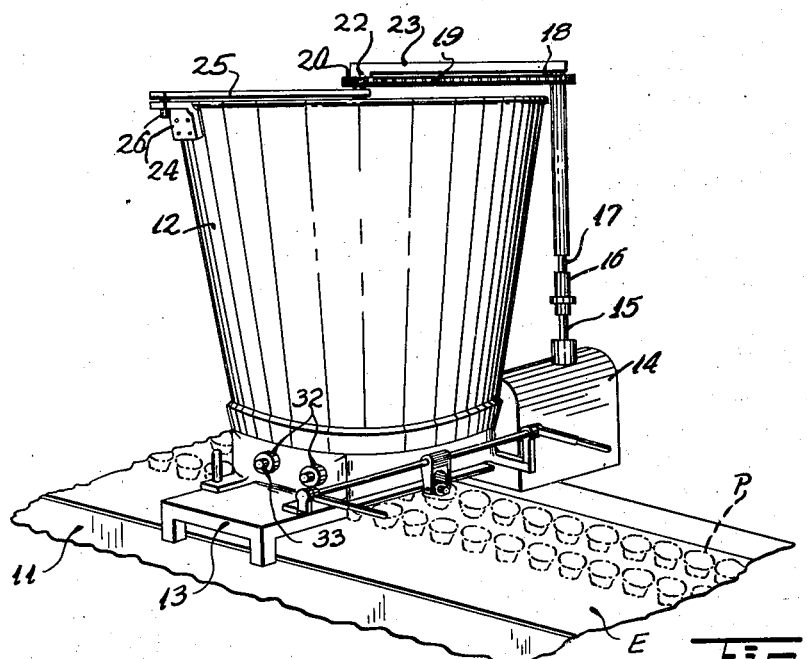
Fig-1-
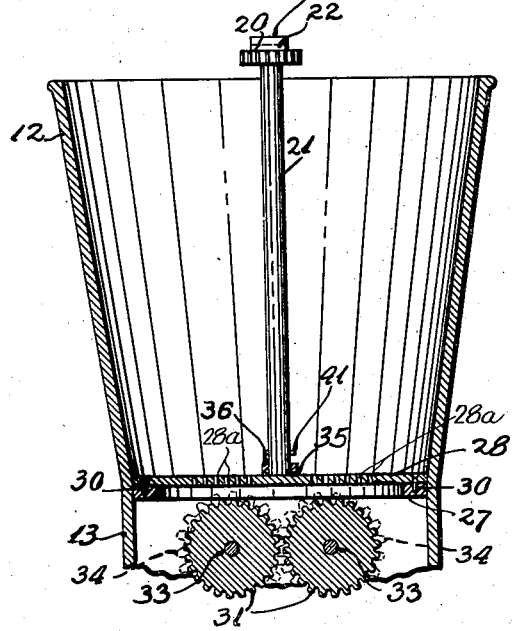
Fig-2-
INVENTOR
Doris I. Weeden
BY
ATTORNEY Oct. 18, 1949.　　　　D. I. WEEDEN　　　　2,485,226
ICING COMMINUTOR AND EXTRUDER
Filed Oct. 16, 1945　　　　　　　　　　　3 Sheets-Sheet 2
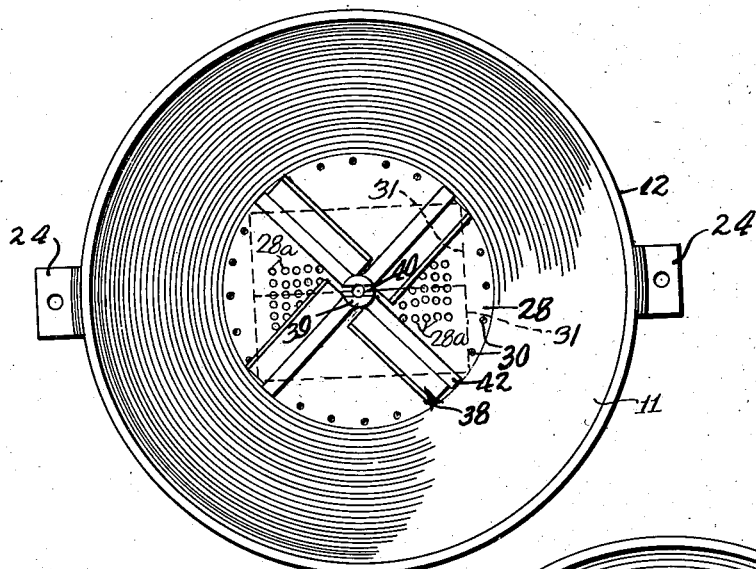
Fig-3-
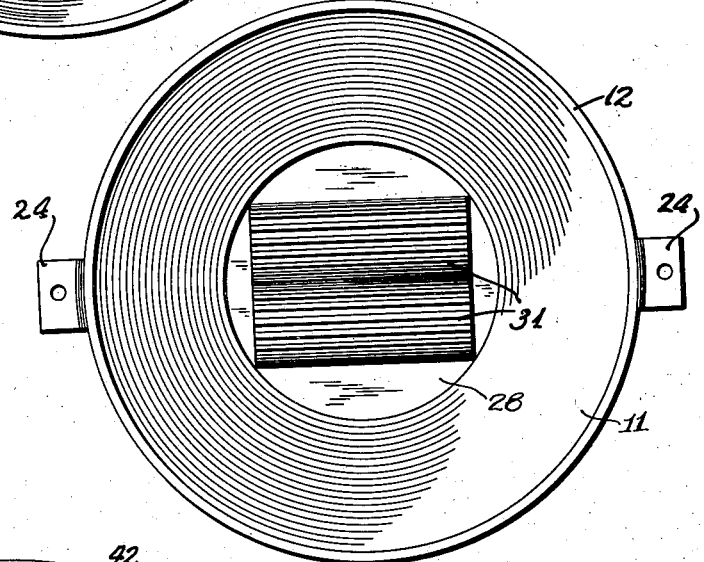
Fig-4-
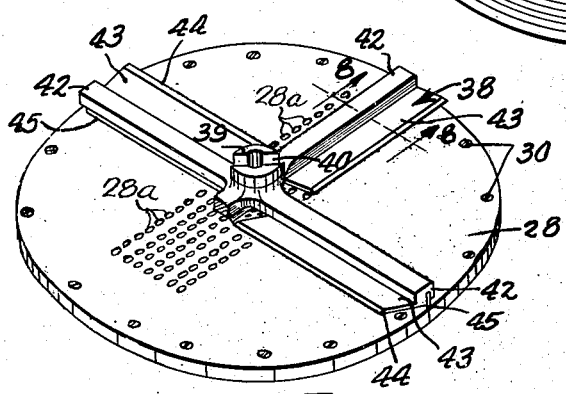
Fig-5-
INVENTOR
Doris I. Weeden
BY
ATTORNEY Oct. 18, 1949.   D. I. WEEDEN   2,485,226
ICING COMMINUTOR AND EXTRUDER
Filed Oct. 16, 1945   3 Sheets-Sheet 3
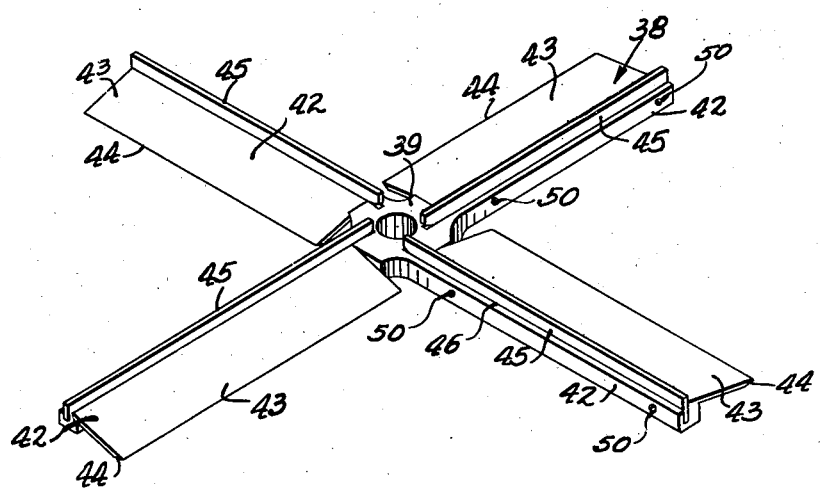
Fig-6-
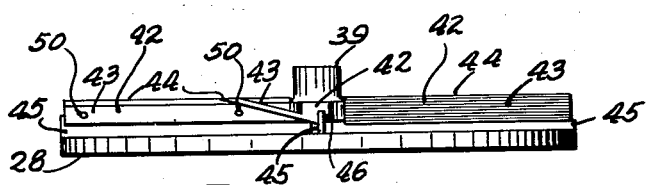
Fig-7-
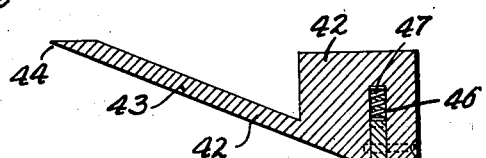
Fig-8-
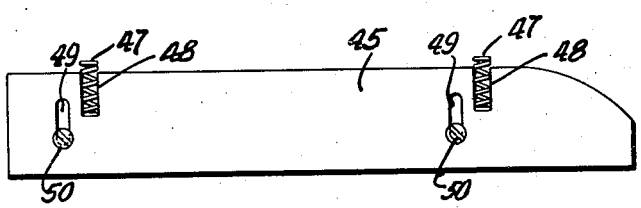
Fig-9-
INVENTOR
Doris I. Weeden
BY
ATTORNEY Patented Oct. 18, 1949

2,485,226

UNITED STATES PATENT OFFICE 2,485,226

ICING COMMINUTOR AND EXTRUDER

Doris I. Weeden, Asbury Park, N. J.

Application October 16, 1945, Serial No. 622,495

5 Claims. (Cl. 107—7)

1

This invention relates to novel and useful improvements in machines for icing cakes, confectionery and pastry, such as cup cakes, in which the cakes are each held in a wrapper or container in the form of a round or other shaped container or cup of oiled or waxed paper and may take a square or oblong shape when being fed along beneath the icing machine by being held in guides and against each other on an endless conveyor or carrier for coating the same on top with the icing, although this is not essential, as the cakes or the like and the cups or the like may be any material or shape and size, or a metal pan.

The invention proposes an improvement in icing digesting extruder for ejecting icing on top of cakes or pastry from a hopper through a perforated disc, the device serving to insure thorough comminution or mashing of the lumps or lumpy material in the semi-liquid icing, and to prevent lumpy icing material clogging up the perforations or apertures of the perforated disc and tending to harden therein and thus obstruct the feeding of the icing, as well as to prevent lumpy material coming through the perforated disc and to insure that the icing shall be free of lumps and smooth thereby insuring a uniform mixture and layer of icing on the cakes or pastry and economizing in the use thereof.

The invention therefore proposes a novel bladed extruder having a set of radial blades or arms which are rotated over and against the material on the disc in a hopper containing the icing, to thoroughly mix the icing material during the icing or coating operation, to break, divide and mash the lumps in the icing and press or force the same through the perforations in the disc to cause the same to be uniformly flowed onto the cakes or pastry as the latter are moved or fed along beneath the hopper, disc in the bottom thereof and a pair of corrugated rollers therebeneath designed to feed the icing coming down from the disc, after receiving the same so that the icing is fed uniformly to the cakes or pastry for icing or coating the same with a layer of even or uniform thickness.

The invention further proposes a novel extruder having a set of plurality of blades with angularly extending inclined or slanting flanges the lead or front edges of which are highest to gather in and force the icing material downwardly through the perforations of the disc, and also having resiliently mounted floating vertical or upright blades perpendicular or similarly positioned relative to the plane and surface of the disc and pressed resiliently downwardly so that

2 as bladed extruder or arms thereof rotate, or the disc or hopper, the icing material is compressed against the top surface of the disc and forced through the perforations thereof, while the vertical blades receive the pressure of the material forced thereagainst so that the material is forced by the inclined blades through the perforations of the disc and the spring pressed blades scrape the material from the surface of the disc and prevents the same coagulating thereon and by reason of its resilient mounting will spring or give and prevent injury thereto by reason of compensation for any obstruction which might tend to interfere with such rotation and injure the parts, while at the same time maintaining sufficient pressure to mash all lumps and force the icing material through the perforations of the disc to the corrugated rollers for depositing and spreading the same onto the cakes or other pastry.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a cake or pastry icing machine constructed in accordance with the present invention.

Fig. 2 is a vertical central section through the hopper.

Fig. 3 is a top plan view looking down into the hopper.

Fig. 4 is a bottom plan view showing the corrugated rollers beneath the hopper.

Fig. 5 is an enlarged perspective view showing the rotating extruder on the perforated disc at the bottom of the hopper, but with one of the extruder arms broken away.

Fig. 6 is an enlarged perspective view of the extruder in an inverted position.

Fig. 7 is a sectional side elevation or edge view of the extruder on the disc.

Fig. 8 is a sectional view of the extruder taken on the line 8—8 of Fig. 5.

Fig. 9 is fragmentary side view of one of the vertical blades of the extruder.

The icing machine, according to the present invention, includes a table, bench or warming oven 11 over suitable heating means if desired, and forming a horizontal supporting surface or support for the mechanism and along which the confectionery, cakes or pastry P to be iced or coated on top is to be passed. The pastry or confectionery is shown by way of example as cakes, specifically of the small variety known as cup cakes in containers or cups of oiled or waxed paper or the like, and are shown being fed along or advanced as on an endless conveyor, belt or a plurality of the same, designated at E beneath a hopper 12 mounted on and secured to a base 13 secured to the table or supporting surface 11 in a manner to span or straddle the conveyor and cakes thereon. A power drive including a motor 14 suitably housed if desired, is mounted on or at the back of the oven, table or support 11 at one side of the hopper. This motor drive may be any suitable form of prime mover such as an electric motor having its rotor drive shaft 15 coupled at 16 to a vertical shaft 17 carrying a pulley or sprocket wheel 18 at its upper end on which an endless drive belt or chain 19 is trained in connection with a pulley or sprocket wheel 20 fixed to the upper end of a vertical driven shaft 21 having a bearing 22 at its upper portion in the inner end of a horizontal bearing arm 23 provided therefor and capable of swinging horizontally if desired, on the shaft 15 or 17 as an axis over the hopper 12.

The hopper 12 has diametrically opposed apertured angular bracket arms 24 to which a diametrical cross brace 25 is secured or bolted as at 26 through apertures in the ends thereof. At the bottom of the hopper 12 is an annular seat or shoulder shown in the form of a ring 27 on which a bottom disc 28 is seated and secured as by dowel pins or screws 30 entering apertures or holes in the ring and secured by any suitable means at spaced points around the periphery of the disc 28 and the ring 27. The disc 28 is formed on diametrically opposite sides of its center with groups of perforations 28ª at locations directly above the rows of cakes P passing beneath the hopper 12. In the base 13, two coacting intermeshing adjacent parallel corrugated feed rollers 31 are rotatably supported in bearings 32 and the shafts 33 thereof which are journaled in the bearings 32, have fixed thereto, gears or pinions 34 which mesh and rotate inwardly and downwardly at the inside to feed the icing therebetween to the cakes P to coat the same. The adjacent rollers are located immediately below the groups of perforations 28ª and serve to form a composite flat strip of the strings of icing which pass from the perforations. From the rollers 31, the icing falls onto the tops of the cakes P as a continuous flat laterally corrugated strip.

The vertical driven shaft 21 mounted axially of the hopper 12 is mounted in a stationary bronze bushing 35 at its lower end. This bushing or bearing is stepped or provided with a shoulder 36 to receive and support the lower end of the shaft 21 and is secured to the disc 28 at a central opening therein and fixed in any suitable way to take the weight and end thrust of the shaft 21 for rotation therein.

The special feature of the invention consists of an icing digesting extruder 38 having a bearing sleeve or hub 39 at the center formed with a diametrical slot at groove 40 receiving a cross pin or spline 41 on the lower end of the shaft 21 so as to fix the extruder thereto for rotation therewith. The extruder comprises a set or plurality of radial arms or blades 42, shown as four in number, extending from the hub or sleeve 39 in diametrical alignment and with forwardly extending angularly inclined, slanting or sloping flanges 43 sharpened at their forward edges as shown at 44 and merging at their inner lower edges with the bottom surfaces of the arms so as to extend upwardly in a forward direction at which sides, the flanges of the blades extend, in this manner, when the shaft 21 and extruder are rotated, the blades will revolve over the perforated disc, so that as the icing material in the hopper is fed to the disc, the same will be forced forwardly and downwardly as it is turned with the extruder and ejected to the corrugated feed rollers 31 through the perforations of the disc 28. The castings of the arms 42 are provided with vertical blades 45 mounted resiliently in corresponding slots 46 in the arms and held down by compression springs 47 also mounted in the arms above the blades 45, such as in slots or counterbores therein above the slots 46 and engaging the bottom walls or edges of recesses 48 in the top edges of the blades 45. The blades 45 are also provided with elongated vertical slots 49 therethrough to receive guide pins or screws 50 which guide the blades up and down and prevent displacement thereof or radial or longitudinal movement in the slots or grooves 46 which open through the outer ends of the arms 42. The pins or screws 50 extend into the arms 42 from the back thereof as shown. These blades prevent lumpy material from coming through the perforations of the disc at the bottom of the hopper and the inclined portions or surfaces by reason of being inclined rearwardly, press downwardly on the icing material in front and beneath the same to thoroughly mash and break up the lumps therein into finely comminuted material or form so as to prevent the perforations of the disc from clogging up. Thus, as the extruder rotates, the blades behind the flanges inclined as set forth, engage the icing material against which the material is compressed and pressed against the perforated disc, and the blades 45 force the material through the perforations to the rollers and then onto the cakes or the like traveling therebeneath on the endless conveyor or carrier for evenly and uniformly coating or icing the same upon their top surfaces.

It should also be noted that the blades 45 are provided with rectilinear or straight bottom edges which are disposed against the disc and effectively keep the same unobstructed so that the material will not cake thereon. These edges are horizontal and perpendicular to the vertical ends and plane of the blades 45, while the top edges thereof are arcuate or curved downwardly at their inner portions to project from the inner ends of the vertical guide slots 46 which are shaped to correspond therewith and limit the upward movement of the blades. The inner ends of the blades are also spaced slightly apart so as to allow the material to pass and prevent obstruction and interfere with rotation of the blades of the extruder. This prevents undue load on the drive parts and mechanism and insures perfect operation of the icing machine and economical coating of the cakes with a uniform layer of icing without lumps or unevenness, which may be done with quickness and dispatch.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. The combination with a hopper having a perforated bottom, of a set of arms rotatably mounted on the bottom, said arms each comprising forwardly and upwardly inclined portions and downwardly projecting blades in rear thereof, said latter blades being spring pressed downwardly to engage the perforated bottom, and the inclined portions adapted to press the material downwardly when rotated toward the high side.

2. The combination with a hopper having a perforated bottom, of a set of arms rotatably mounted on the bottom, said arms each comprising forwardly and upwardly inclined portions and downwardly projecting blades in rear thereof, said inclined portions serving to compress the material against the latter blades in spaced relation to the bottom and be forced through the perforations, and means to cause the downwardly projecting blades to float on the bottom.

3. The combination with a hopper having a perforated bottom, of a set of arms rotatably mounted on the bottom, said arms each comprising forwardly and upwardly inclined portions and downwardly projecting blades in rear thereof, said portions being inclined rearwardly and to rotate in the opposite direction, to compress and mash lumps of material and the projecting blades adapted to force the material through the perforations in finely divided form free of lumps.

4. In an icing machine, a hopper having a base and a perforated bottom disc, a vertical axial shaft in the hopper, means for rotating said shaft, an extruder fixed to the lower end of the shaft to rotate over the top face of said disc, said extruder including a hub having a set of radial arms having rearwardly inclined flanges and sharp forward edges spaced from the disc to force the material toward the disc as the arms rotate, and downwardly pressed vertical blades mounted in the arms at the lower portions of the inclined surfaces formed by the flanges and arms to scrape the top surface of the disc and force the icing material through the perforations in mashed condition free of lumps.

5. In an icing machine, a hopper having a base and a perforated bottom disc, a vertical axial shaft in the hopper, means for rotating said shaft, an extruder fixed to the lower end of the shaft to rotate over the top face of said disc, said extruder including a hub having a set of radial arms having rearwardly inclined flanges and sharp forward edges spaced from the disc to force the material toward the disc as the arms rotate, and downwardly pressed vertical blades mounted in the arms at the lower portions of the inclined surfaces formed by the flanges and arms to scrape the top surface of the disc and force the icing material through the perforations in mashed condition free of lumps, said inclined surfaces and blades terminating in spaced relation to the center of the extruder at the hub.

DORIS I. WEEDEN.

REFERENCES CITED

The following references are of record in the file of this patent:

UNITED STATES PATENTS

| Number | Name | Date |
| --- | --- | --- |
| 376,068 | Chase | Jan. 10, 1888 |
| 779,031 | Drake | Jan. 3, 1905 |
| 870,500 | Fahrenheim | Nov. 5, 1907 |
| 916,420 | Chavis | Mar. 30, 1909 |
| 1,290,732 | Gants et al. | Jan. 7, 1919 |
| 1,301,065 | Kunst | Apr. 15, 1919 |
| 1,449,933 | Becke | Mar. 27, 1923 |
| 1,469,142 | Funck | Sept. 25, 1923 |
| 1,606,721 | Rihl | Nov. 9, 1926 |
| 1,986,934 | Laemmel | Jan. 8, 1935 |
| 2,049,083 | Schaeffer | July 28, 1936 |
| 2,298,644 | Hummel | Oct. 13, 1942 |

FOREIGN PATENTS

| Number | Country | Date |
| --- | --- | --- |
| 133,726 | Germany | Apr. 28, 1900 |
| 138,360 | Australia | July 25, 1934 |